United States Patent
Chang et al.

(10) Patent No.: US 10,816,321 B2
(45) Date of Patent: Oct. 27, 2020

(54) MEASUREMENT DEVICE AND OPERATION METHOD THEREOF

(71) Applicant: PIXART IMAGING INC., Hsin-Chu (TW)

(72) Inventors: Ting-Yang Chang, Hsin-Chu (TW); Shih-Wei Kuo, Hsin-Chu (TW); Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 797 days.

(21) Appl. No.: 15/349,923

(22) Filed: Nov. 11, 2016

(65) Prior Publication Data

US 2017/0350691 A1 Dec. 7, 2017

(30) Foreign Application Priority Data

Jun. 1, 2016 (TW) .............................. 105117191 A

(51) Int. Cl.
*G01C 3/08* (2006.01)
*G01B 11/04* (2006.01)
*G01S 17/08* (2006.01)
*G01S 17/04* (2020.01)
*G01S 17/88* (2006.01)

(52) U.S. Cl.
CPC ............ *G01B 11/043* (2013.01); *G01S 17/04* (2020.01); *G01S 17/08* (2013.01); *G01S 17/88* (2013.01)

(58) Field of Classification Search
CPC ....... G01B 11/043; G01S 17/88; G01S 17/08; G01S 17/026; G06F 3/0312; G06F 3/03541; G06F 3/03546; G06F 3/03549; G01D 5/3473

USPC ................................................ 356/3.01–5.15
See application file for complete search history.

(56) References Cited

U.S. PATENT DOCUMENTS

| | | | | |
|---|---|---|---|---|
| 4,834,531 A | * | 5/1989 | Ward .................... | B64G 1/646 244/172.4 |
| 5,560,119 A | * | 10/1996 | LeBreton ................ | G01B 3/12 33/701 |
| 7,456,936 B2 | * | 11/2008 | Gogolla ............... | G01C 15/002 356/4.01 |
| 2002/0021450 A1 | * | 2/2002 | Aoki ....................... | G01D 5/26 356/499 |
| 2005/0057492 A1 | * | 3/2005 | Bathiche ............... | G06F 3/0317 345/156 |
| 2008/0216685 A1 | * | 9/2008 | Omoto ................. | B41F 33/0036 101/211 |

(Continued)

FOREIGN PATENT DOCUMENTS

| | | |
|---|---|---|
| CN | 1700158 A | 11/2005 |
| CN | 101923881 A | 12/2010 |

(Continued)

*Primary Examiner* — Samantha K Abraham
(74) *Attorney, Agent, or Firm* — Li & Cai Intellectual Property (USA) Office

(57) ABSTRACT

Provided herein are a measurement device and an operation method thereof. The measurement device senses a distance variation between the measurement device and an object using a built-in proximity sensor and accordingly determines whether to turn on or turn off a track sensing module and an optical ranging module such that the measurement device provides intelligent selection to achieve energy saving without being interfered with by other sensors being turned on.

15 Claims, 10 Drawing Sheets

(56) References Cited

U.S. PATENT DOCUMENTS

| | | | |
|---|---|---|---|
| 2009/0295718 A1 | 12/2009 | Cheah et al. | |
| 2012/0044476 A1* | 2/2012 | Earhart | G01S 3/7867 |
| | | | 356/4.01 |
| 2013/0328262 A1 | 12/2013 | Kamiyama et al. | |
| 2015/0206343 A1* | 7/2015 | Mattila | G06T 17/05 |
| | | | 345/420 |
| 2017/0059712 A1* | 3/2017 | Yates | G01S 17/107 |

FOREIGN PATENT DOCUMENTS

| | | |
|---|---|---|
| CN | 102844791 A | 12/2012 |
| CN | 103076925 A | 5/2013 |
| CN | 103135858 A | 6/2013 |
| CN | 103455137 A | 12/2013 |
| CN | 104049775 A | 9/2014 |
| CN | 105046257 A | 11/2015 |
| JP | 2010-58279 A | 3/2010 |

* cited by examiner

MEASUREMENT DEVICE AND OPERATION METHOD THEREOF

BACKGROUND

1. Technical Field

The present invention generally relates to a measurement device and an operation method thereof and, more particularly, to a measurement device providing optical ranging and track sensing and an operation method of the measurement device.

2. Description of Related Art

Conventionally, a measurement device based on optical ranging emits sensing light on an object and estimates the time of flight (TOF) for light travelling between the measurement device and the object after receiving the sensing light reflected by the object so as to calculate a distance between the measurement device and the object.

However, the optical ranging fails to calculate the surface length of the object according to the sensing light reflected by the object. Therefore, in the case the surface length of the object is required it is not possible to simply use the measurement device. In view of this, there is a need for providing a measurement device capable of calculating the surface length of the object.

SUMMARY

One embodiment of the present invention provides a measurement device. The measurement device includes a roller, at least one proximity sensor, a track sensing module, an optical ranging module and a processor. The roller is disposed at a bottom of the measurement device. The proximity sensor is configured to sense a proximity status between the measurement device and an object and accordingly provide an estimated distance. The track sensing module is disposed in the measurement device and is configured to continuously capture a plurality of reference pictures of a regional surface of the roller and calculate a track length of the measurement device according to the plurality of reference pictures. The optical ranging module is also disposed in the measurement device and is configured to emit a light beam towards the outside of the measurement device and calculate a distance data according to the light beam being reflected. The processor is coupled among the proximity sensor, the track sensing module and the optical ranging module and is configured to selectively turn on or turn off the track sensing module and the optical ranging module according to the estimated distance. When the estimated distance is smaller than a first pre-determined threshold, the processor turns on the track sensing module and turns off the optical ranging module. When the estimated distance is larger than a second pre-determined threshold, the processor turns off the track sensing module and turns on the optical ranging module.

One embodiment of the present invention further provides an operation method for a measurement device. The operation method includes steps as follows. A proximity sensor senses a proximity status between the measurement device and an object and accordingly provides an estimated distance. A processor selectively turns on or turns off the track sensing module and the optical ranging module according to the estimated distance. When the estimated distance is smaller than a first pre-determined threshold, the processor turns on the track sensing module and turns off the optical ranging module. When the estimated distance is larger than a second pre-determined threshold, the processor turns off the track sensing module and turns on the optical ranging module.

In view of the above, the present invention provides a measurement device and an operation method thereof, capable of sensing a distance variation between the measurement device and an object using a built-in proximity sensor and accordingly determining whether to turn on or turn off a track sensing module and an optical ranging module such that the measurement device provides intelligent selection to achieve energy saving without being interfered with by other sensors being turned on. In addition, the measurement device in the present invention uses the rotation of the roller to acquire a relative movement on the surface of an object, and the track calculated by the built-in track sensing module is based on a plurality of reference pictures of a regional surface of the roller. The measurement device in the present invention can precisely calculate a track length of the measurement device along the surface of the object.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

Figure 1:
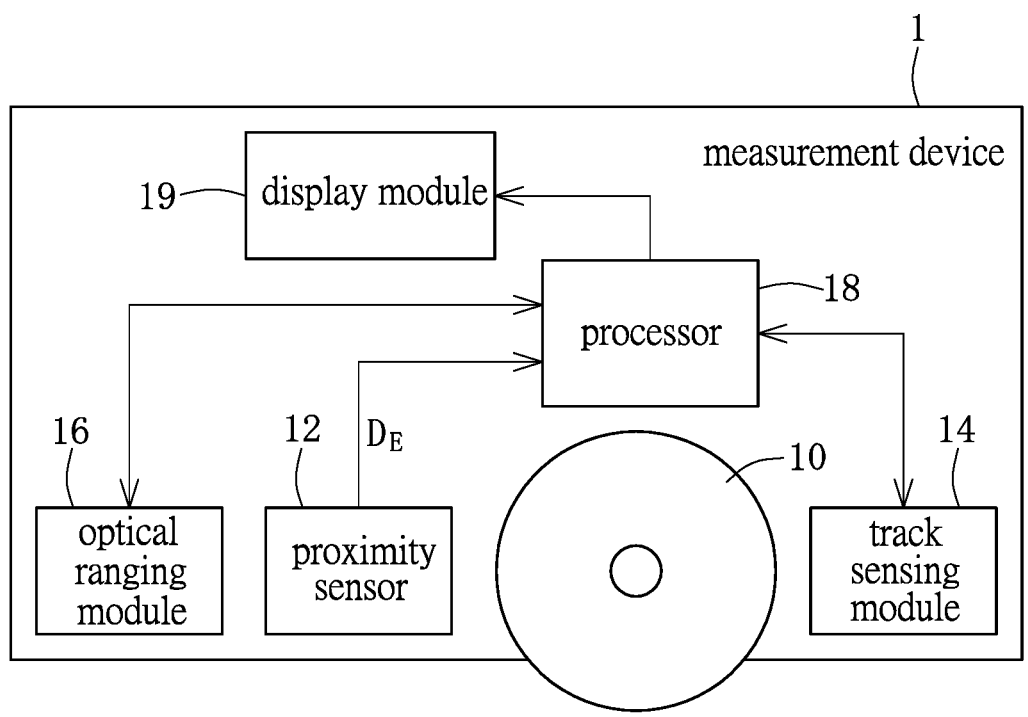
FIG. 1 is a block diagram of a measurement device according to one embodiment of the present invention.
Figure 2:
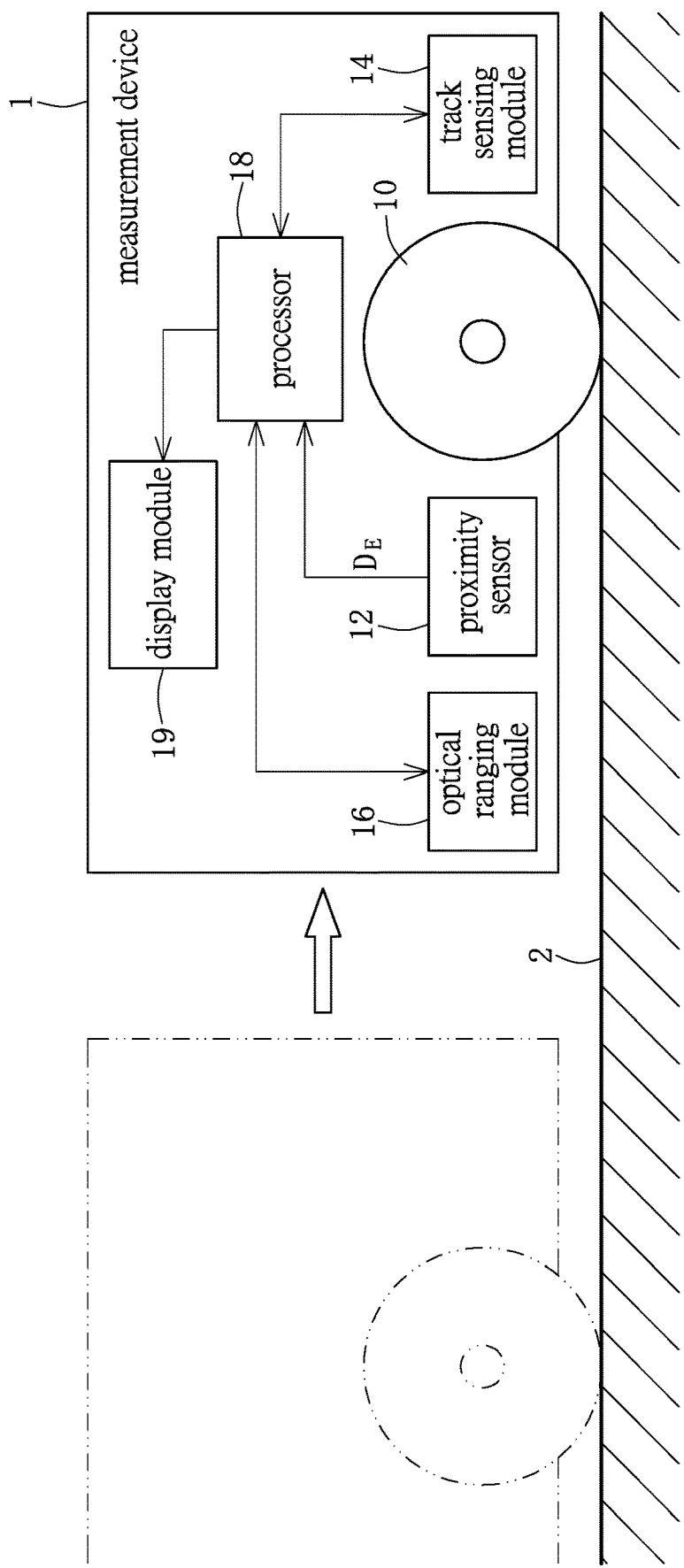
FIG. 2 is a schematic diagram of a measurement device according to one embodiment of the present invention.

Referring to FIG. 1 and FIG. 2, FIG. 1 is a block diagram of a measurement device according to one embodiment of the present invention and FIG. 2 is an operational diagram of a measurement device according to one embodiment of the present invention. The measurement device 1 includes a roller 10, at least one proximity sensor 12, a track sensing module 14, an optical ranging module 16 and a processor 18. The track sensing module 14, the optical ranging module 16 and the processor 18 can be implemented by hardware circuitry, or by hardware circuitry with firmware or with software implemented by hardware circuitry, or by hardware circuitry with firmware or with software. In brief, the present invention is not limited to the implementation of the measurement device 1. Moreover, the track sensing module 14, the optical ranging module 16 and the processor 18 can be integrated or discretely disposed, to which the present invention is not limited. In addition, the positions where the roller 10, the proximity sensor 12, the track sensing module 14, the optical ranging module 16 and the processor 18 are disposed in the measurement device 1 are not limited to the examples in FIG. 1 or FIG. 2. A person with ordinary skill in the art may make any designs according to practical demands or applications.

More particularly, the roller 10 is disposed at a bottom of the measurement device 1. The roller 10 is further disposed against the surface of an object 2, such that the measurement device 1 moves along the surface of the object 2 with the rotation of the roller 10, as shown in FIG. 2. It should be noted that the present invention is not limited to the implementation of the roller 10. A person with ordinary skill in the art may make any designs according to practical demands or applications. Therefore, the detailed description of the roller 10 is not presented herein.

Furthermore, the proximity sensor 12 is configured to sense a proximity status between the measurement device 1 and the object 2 and accordingly provide an estimated distance $D_E$. It should be noted that, in a specific embodiment, the proximity sensor 12 senses periodically, for example, every other second or every other half second, to determine the proximity status between the measurement device 1 and the object 2, to which the present invention is not limited. Then, the track sensing module 12 is disposed in the measurement device 1 and is configured to continuously capture a plurality of reference pictures of a regional surface of the roller 10 and calculate a track length of the measurement device 1 along the surface of the object 2 according to the plurality of reference pictures.

The optical ranging module 16 is also disposed in the measurement device 1 and is configured to emit a light beam towards the outside of the measurement device 1 and calculate a distance data according to the light beam being reflected. The processor 18 is coupled among the proximity sensor 12, the track sensing module 14 and the optical ranging module 16 and is configured to selectively turn on or turn off the track sensing module 14 and the optical ranging module 16 according to the estimated distance $D_E$ provided by the proximity sensor 12. When the estimated distance $D_E$ is smaller than a first pre-determined threshold, the processor 18 turns on the track sensing module 14 and turns off the optical ranging module 14. When the estimated distance $D_E$ is larger than a second pre-determined threshold, the processor 18 turns off the track sensing module 14 and turns on the optical ranging module 16.

Therefore, according to the teachings stated above, a person with ordinary skill in the art would understand that one of the goals of the present invention is that the built-in proximity sensor 12 in the measurement device 1 is used to acquire the estimated distance $D_E$ between the measurement device 1 and the object 2 and the processor 18 is used to analyze the estimated distance $D_E$ so as to determine whether to turn on the track sensing module 14 to sense the movement of the measurement device 1 along the surface of the object 2 or whether to turn on the optical ranging module 16 to sense the distance between the measurement device 1 and the object 2. In view of this, compared to the conventional art which only provides a single technique, the measurement device 1 of the present invention provides two techniques to bring forth more convenience.

Furthermore, the basic principle of the proximity sensor 12 is that the measurement device 1 determines whether to move closer to or away from the object 2. Accordingly, a person with ordinary skill in the art would understand that the estimated distance $D_E$ provided by the proximity sensor 12 does not effectively indicate the actual distance between the measurement device 1 and the object 2. Moreover, the present invention is not limited to the units (for example, cm, m, and so forth) for the estimated distance $D_E$. In other words, a person with ordinary skill in the art may design the estimated distance $D_E$ according to practical demands or applications.

Figure 3A:
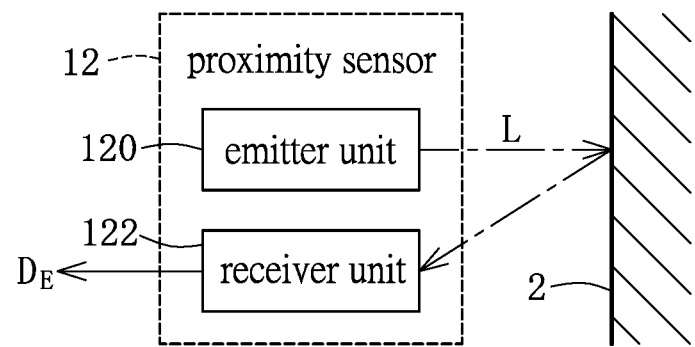
FIG. 3A is a block diagram of a proximity sensor in a measurement device according to one embodiment of the present invention.

However, to further describe the proximity sensor 12 in detail, the present invention provides two implementations of the proximity sensor 12. Referring to FIG. 3A, FIG. 3A is a block diagram of a proximity sensor in a measurement device according to one embodiment of the present invention. The proximity sensor 12 includes an emitter unit 120 and a receiver unit 122. The proximity sensor 12 in FIG. 3A uses the emitter unit 120 to emit an optical signal L, which is then reflected by the object 2 to the receiver unit 122, such that the receiver unit 122 determines the proximity status (closer or away) between the measurement device 1 and the object 2 according to an intensity variation of the received optical signal L to correspondingly provide the estimated distance $D_E$.

Figure 3B:
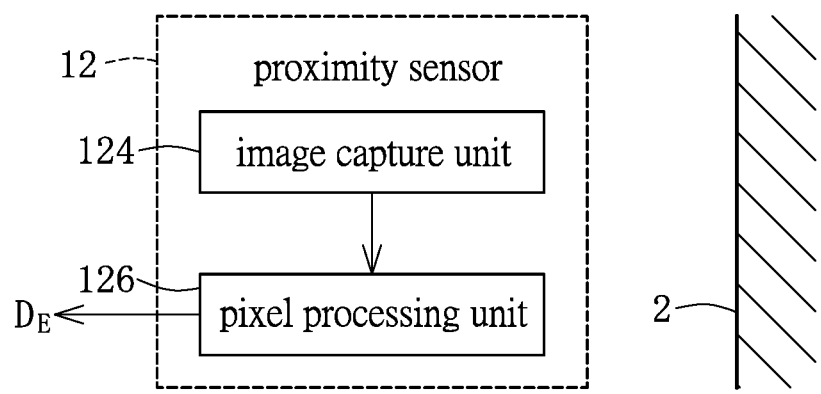
FIG. 3B is a block diagram of a proximity sensor in a measurement device according to another embodiment of the present invention.

Moreover, referring to FIG. 3B, FIG. 3B is a block diagram of a proximity sensor in a measurement device according to another embodiment of the present invention. Compared to the proximity sensor 12 in FIG. 3A, the proximity sensor 12 in FIG. 3B includes an image capture unit 124 and a pixel processing unit 126. The proximity sensor 12 in FIG. 3B uses the image capture unit 124 to capture an image of the object 2 and uses the pixel processing unit 126 to calculate a number of pixel clusters occupied by the object 2 according to the image. Then, the pixel processing unit 126 determines the proximity status (closer or away) between the measurement device 1 and the object 2 according to the number of pixel clusters to correspondingly provide the estimated distance $D_E$. Practically, the object 2 has a fixed structure, such that it can be identified by the pixel processing unit 126. If the measurement device 1 moves closer to the object 2, the image of the object 2 is larger, which results in a larger number of pixel clusters occupied by the object 2. On the contrary, if the measurement device 1 moves away from the object 2, the image of the object 2 is smaller, which results in a smaller number of pixel clusters occupied by the object 2.

Therefore, according to the teachings stated above, a person with ordinary skill in the art would know that the proximity sensor 12 in FIG. 3A determines whether the measurement device 1 moves closer to or away from the object 2 according to the intensity variation of the received optical signal L. In FIG. 3B, the proximity sensor 12 determines whether the measurement device 1 moves closer to or away from the object 2 according to the variation of the number of pixel clusters occupied by the object 2. To sum up, the above implementations only exemplify, with no intention to limit, the present invention. A person with ordinary skill in the art may design the proximity sensor 12 according to practical demands or applications.

On the other hand, referring again to FIG. 2, when the user wants to acquire the track length of the measurement device 1 along the surface of the object 2, the user has to move the measurement device 1 close to the object 2 until the roller 10 is disposed against the surface of the object 2. Therefore, when the estimated distance $D_E$ is smaller than a first pre-determined threshold (for example, 3 cm), the measurement device 1 of the present invention uses the built-in processor 18 to turn on the track sensing module 14 to measure the displacement of the measurement device 1 along the surface of the object 2. Moreover, to achieve energy saving without being interfered with by other sensors being turned on, the processor 18 can turn off the control optical ranging module 16 at the same time when the processor 18 has determined to turn on the track sensing module 14 to measure the displacement of the measurement device 1.

On the contrary, when the user wants to acquire the actual distance data between the measurement device 1 and the object 2, the user has to keep the measurement device 1 and the object 2 still, such that the optical ranging module 16 can measure the time of flight. Therefore, when the estimated distance $D_E$ is larger than a second pre-determined threshold (for example, 7 cm), the measurement device 1 of the present invention uses the built-in processor 18 to turn on the optical ranging module 16 to measure the actual distance between the measurement device 1 and the object 2. Similarly, when processor 18 has determined to turn on the optical ranging module 16, the processor 18 can turn off the control track sensing module 14 at the same time to avoid unnecessary power consumption and inference. In view of this, the second pre-determined threshold is larger than or equal to the first pre-determined threshold.

Figure 4:
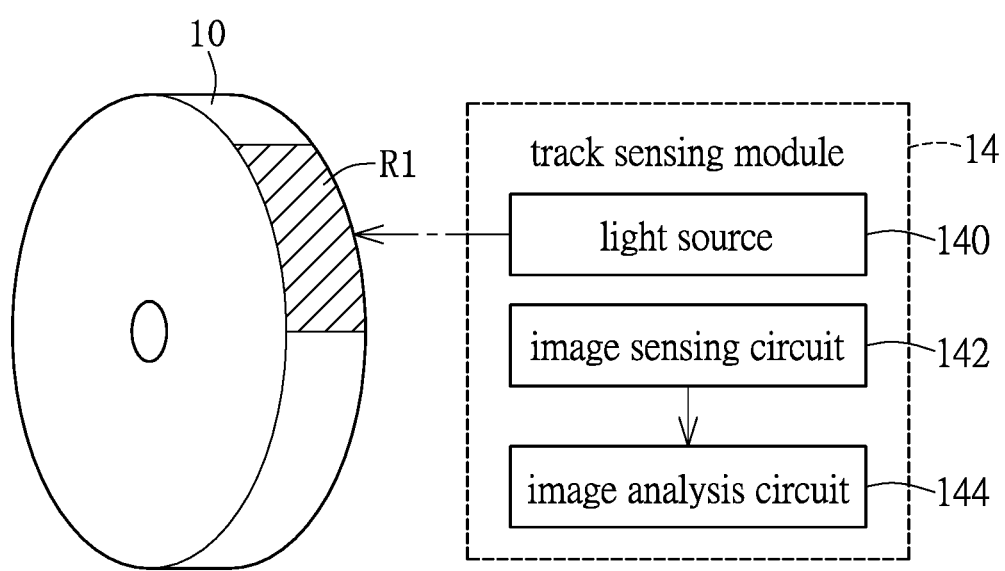
FIG. 4 is a block diagram of a track sensing module in a measurement device according to one embodiment of the present invention.

However, to describe the track sensing module 14 in detail, the present invention further provides an implementation of the track sensing module 14. Referring to FIG. 4, FIG. 4 is a block diagram of a track sensing module in a measurement device according to one embodiment of the present invention. It should be noted that the implementation of the track sensing module 14 in the measurement device 1 only exemplifies, with no intention to limit, the present invention. Moreover, the track sensing module 14 is operable in the operational diagram in FIG. 2. Please refer to FIG. 2 for better understanding. In addition, elements in FIG. 4 that are identical to those in FIG. 1 are labeled in the same way, and descriptions thereof are thus not repeated.

The track sensing module 14 includes a light source 140, an image sensing circuit 142 and an image analysis circuit 144. The image sensing circuit 142 and the image analysis circuit 144 can be implemented by hardware circuitry, or by hardware circuitry with firmware or with software implemented by hardware circuitry, or by hardware circuitry with firmware or with software. To sum up, the present invention is not limited to the implementation of the track sensing module 14. Moreover, the light source 140, the image sensing circuit 142 and the image analysis circuit 144 can be integrated or discretely disposed, to which the present invention is not limited. Moreover, the positions where the light source 140 and the image sensing circuit 142 are disposed corresponding to the roller 10 are not limited to the examples in FIG. 4. A person with ordinary skill in the art may make any designs according to practical demands or applications.

More particularly, the light source 140 is configured to illuminate a regional surface R1 of the roller 10. The image sensing circuit 142 is configured to capture the plurality of reference pictures of the regional surface R1 illuminated by the light source 140 based on a fixed sampling cycle. The image analysis circuit 144 is configured to compare the plurality of reference pictures based on at least one textural feature of the plurality of reference pictures to acquire an illumination track of the light source 140 on the roller 10 and calculate the track length of the measurement device 1 along the surface of the object 2 according to the illumination track.

Furthermore, a conventional optical navigation device (for example, an optical mouse) similarly illuminates a surface and uses an image sensing circuit to capture a plurality of continuous pictures of the surface. The continuous pictures are then compared and analyzed to determine a displacement of the optical navigation device within a time period and perform navigation according to the cursor on a displacement control panel. Therefore, according to the teachings stated above, a person with ordinary skill in the art would understand that the principle of the track sensing module 14 of the present invention is similar to that of the conventional optical navigation device. However, compared to the conventional optical navigation device, the measurement device 1 of the present invention moves along the surface of the object 2 with the rotation of the roller 10. Therefore, the continuous pictures captured by the image sensing circuit 142 correspond to the reference pictures in the regional surface R1 of the roller 10 illuminated by the light source 140. In view of this, even if the surface of the object 2 is irregular, the track sensing module 14 still can precisely calculate the track length of the measurement device 1 along the surface of the object 2. It should be noted that the technology of acquiring the illumination track of the light source 140 by comparing a plurality of reference pictures is known to the person with ordinary skill in the art. Therefore, detailed descriptions of the above are not repeated.

Figure 5:
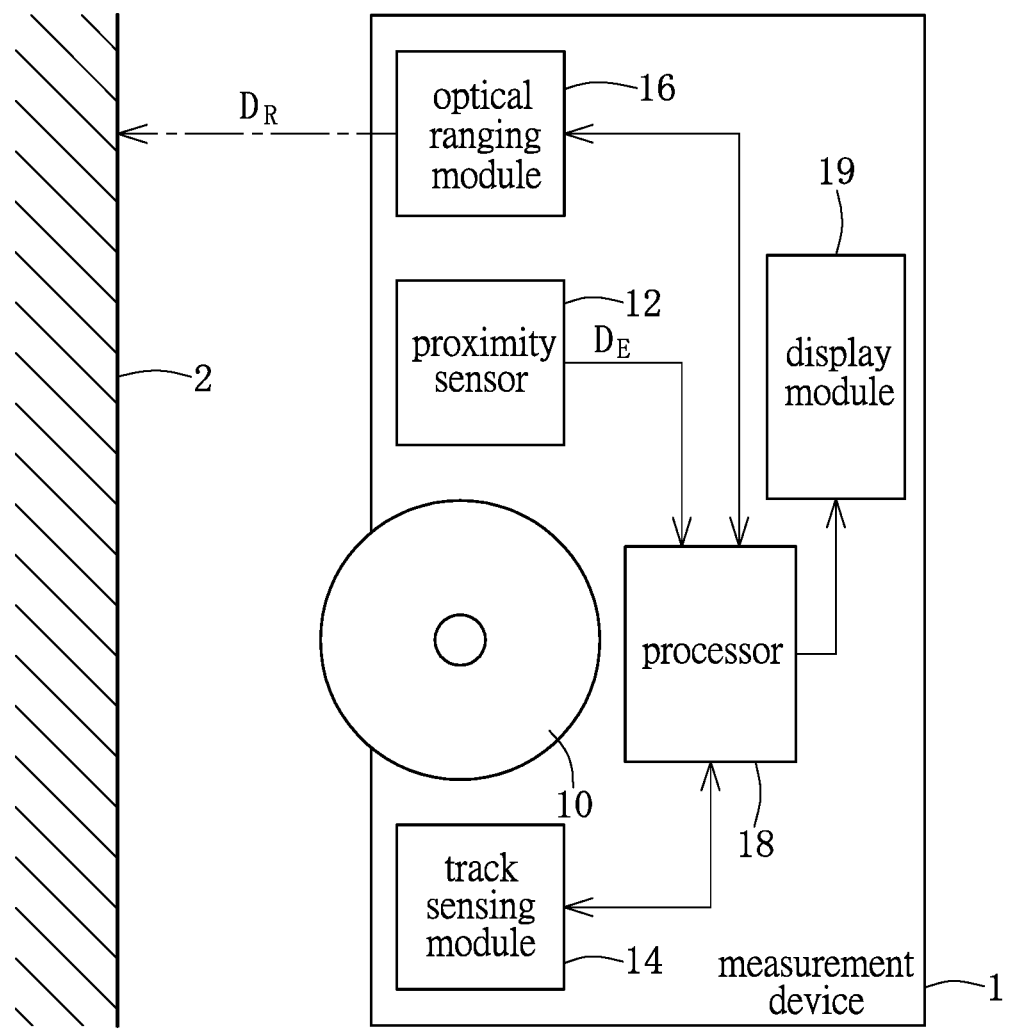
FIG. 5 is a schematic diagram of a measurement device according to another embodiment of the present invention.

On the other hand, referring to FIG. 5, FIG. 5 is an operational diagram of a measurement device according to another embodiment of the present invention. As previously stated, when the user wants to acquire an actual distance data $D_R$ between the measurement device 1 and the object 2, the measurement device 1 of the present invention uses the built-in processor 18 to turn on the optical ranging module 16 (and, meanwhile, turn off the track sensing module 14) to measure the time of flight between the measurement device 1 and the object 2 because the estimated distance $D_E$ is larger than the second pre-determined threshold.

Figure 6:
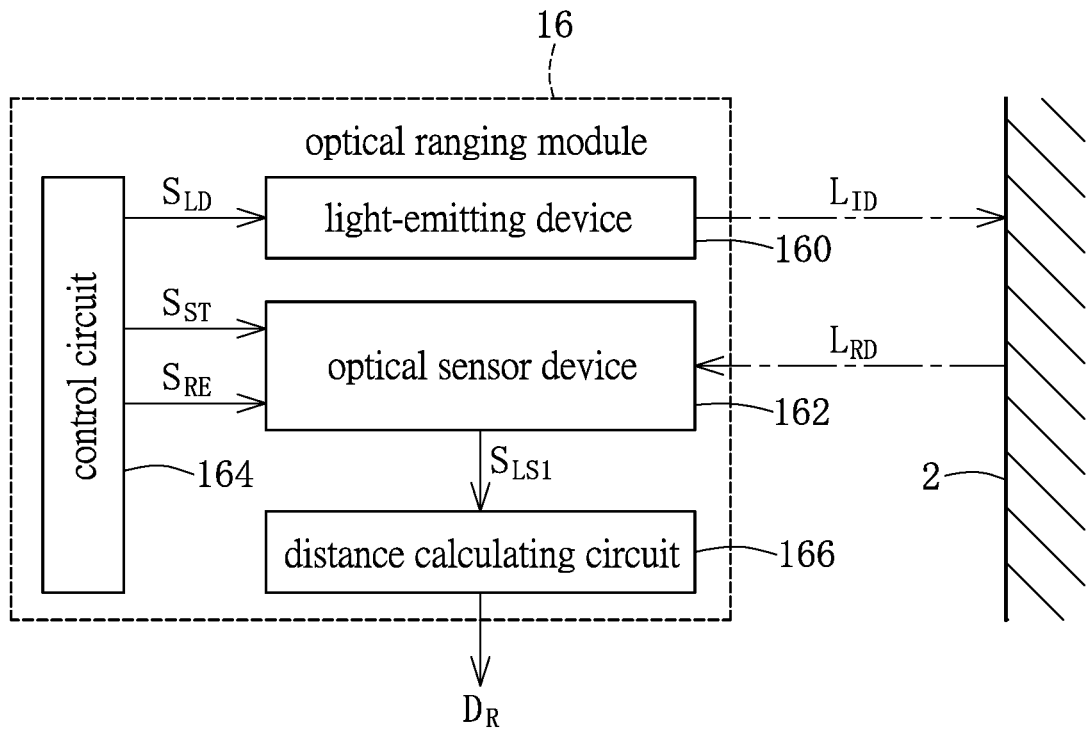
FIG. 6 is a block diagram of an optical ranging module in a measurement device according to one embodiment of the present invention.

Furthermore, referring to FIG. 6, FIG. 6 is a block diagram of an optical ranging module in a measurement device according to one embodiment of the present invention. It should be noted that the implementation of the optical ranging module 16 in the measurement device 1 only exemplifies, with no intention to limit, the present invention. Moreover, the optical ranging module 16 is operable in the operational diagram in FIG. 5. Please refer to FIG. 5 for better understanding. In addition, elements in FIG. 5 that are identical to those in FIG. 1 are labeled in the same way, and descriptions thereof are thus not repeated.

The optical ranging module 16 includes a light-emitting device 160, an optical sensor device 162, a control circuit 164 and a distance calculating circuit 166. The control circuit 164 and the distance calculating circuit 166 can be implemented by hardware circuitry, or by hardware circuitry with firmware or with software implemented by hardware circuitry, or by hardware circuitry with firmware or with software. To sum up, the present invention is not limited to the implementation of the optical ranging module 16. Moreover, the light-emitting device 160, the optical sensor device 162, the control circuit 164 and the distance calculating circuit 166 can be integrated or discretely disposed, to which the present invention is not limited. Moreover, the positions where the light-emitting device 160, the optical sensor device 162, the control circuit 164 and the distance calculating circuit 166 are disposed in the measurement device 1 are not limited to the examples in FIG. 6. A person with ordinary skill in the art may make any designs according to practical demands or applications.

More particularly, the light-emitting device 160 is configured to emit the light beam $L_{ID}$ towards the outside of the measurement device 1 to reach the surface of the object 2. The optical sensor device 162 is configured to sense and accumulate an energy of the light beam $L_{RD}$ being reflected according to a shutter cycle signal $S_{ST}$ to correspondingly provide an optical sensing signal $S_{LS1}$. Practically, the light-emitting device 160 may be a light-emitting diode (LED), and the light-emitting device 160 emits the light beam $L_{ID}$ to the surface of the object 2 according to a lighting cycle signal $S_{LD}$. For example, when the lighting cycle signal $S_{LD}$ is at a high level, the light-emitting device 160 emits the light beam $L_{ID}$ to the surface of the object 2. On the contrary, when the lighting cycle signal $S_{LD}$ is at a low level, the light-emitting device 160 does not emit the light beam $L_{ID}$ to the surface of the object 2.

On the other hand, the optical sensor device 162 may be a charge coupled device (CCD) or a complementary metal-oxide-semiconductor (CMOS) optical sensor device. The optical sensor device 162 senses and accumulates an energy of the light beam $L_{RD}$ being reflected according to a shutter cycle signal $S_{ST}$ to correspondingly provide an optical sensing signal $S_{LS1}$. In addition, the optical sensor device 162 determines whether to provide the optical sensing signal $S_{LS1}$ according to a read signal $S_{RE}$.

For example, when the shutter cycle signal $S_{ST}$ is at a high level, the optical sensor device 162 senses and accumulates the energy of the light beam $L_{RD}$ being reflected. On the contrary, when the shutter cycle signal $S_{ST}$ is at a low level, the optical sensor device 162 does not sense and accumulate the energy of the light beam $L_{RD}$ being reflected. Moreover, when read signal $S_{RE}$ indicates "having been read", the optical sensor device 162 outputs an optical sensing signal $S_{LS1}$ according to the accumulated energy of the reflected light beam $L_{RD}$. It should be noted that, when the read signal S indicates "having been read", the optical sensor device 162 resets the accumulated energy of the reflected light beam $L_{RD}$ (i.e., the optical sensor device 162 will release the accumulated energy) after the optical sensor device 162 outputs the optical sensing signal $S_{LS1}$.

Furthermore, the control circuit 164 is configured to control the light-emitting device 160 to continuously emit the light beam $L_{ID}$ to the surface of the object 2 within a light-emitting period and switch the shutter cycle signal $S_{ST}$ to a high level state within a sensing period after the light-emitting device 160 has emitted the light beam $L_{ID}$ for a delayed period, such that the optical sensor device 162 senses and accumulates the energy of the light beam $L_{RD}$ being reflected and accordingly provides the optical sensing signal $S_{LS1}$. Then, the distance calculating circuit 166 is configured to acquire a time-of-flight (TOF) data between the measurement device 1 and the object 2 according to the energy of the light beam $L_{ID}$ emitted by the light-emitting device 160 within the light-emitting period and the optical sensing signal $S_{LS1}$, and calculate the distance data $D_R$ between the measurement device 1 and the object 2 according to the time-of-flight data. It should be noted that the technologies of acquiring the time of flight based on the energy variation of light and calculating the distance according to the time of flight are known to the person with ordinary skill in the art. Therefore, detailed descriptions of the above are not repeated. To sum up, the above implementations only exemplify, with no intention to limit, the present invention. A person with ordinary skill in the art may design the optical ranging module 16 according to practical demands or applications.

On the other hand, referring back to FIG. 1, the measurement device 1 further includes a display module 19. The display module 19 is configured to display the distance data $D_R$ calculated by the optical ranging module 16 and/or the track length calculated by the track sensing module 14. Practically, the display module 19 may be a touch display or a non-touch display, to which the present invention is not limited. A person with ordinary skill in the art may make any designs according to practical demands or applications.

Figure 7:
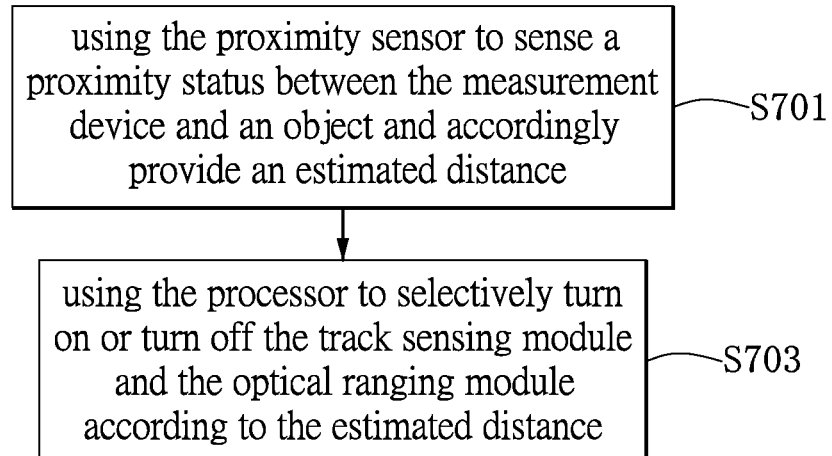
FIG. 7 is a flowchart of an operation method according to one embodiment of the present invention.

In addition, to describe the operation for the measurement device in the previous embodiments, the present invention further provides an operation method. Referring to FIG. 7, FIG. 7 is a flowchart of an operation method according to one embodiment of the present invention. The method can be performed with the measurement device 1 in FIG. 1. Therefore, please refer to FIG. 1 for better understanding.

First, in Step S701, a proximity sensor is used to sense a proximity status between the measurement device and an object and accordingly provide an estimated distance. Then, in Step S703, a processor is used to selectively turn on or turn off the track sensing module and the optical ranging module according to the estimated distance. When the estimated distance is smaller than a first pre-determined threshold, the processor turns on the track sensing module and turns off the optical ranging module. When the estimated distance is larger than a second pre-determined threshold, the processor turns off the track sensing module and turns on the optical ranging module.

Figure 8:
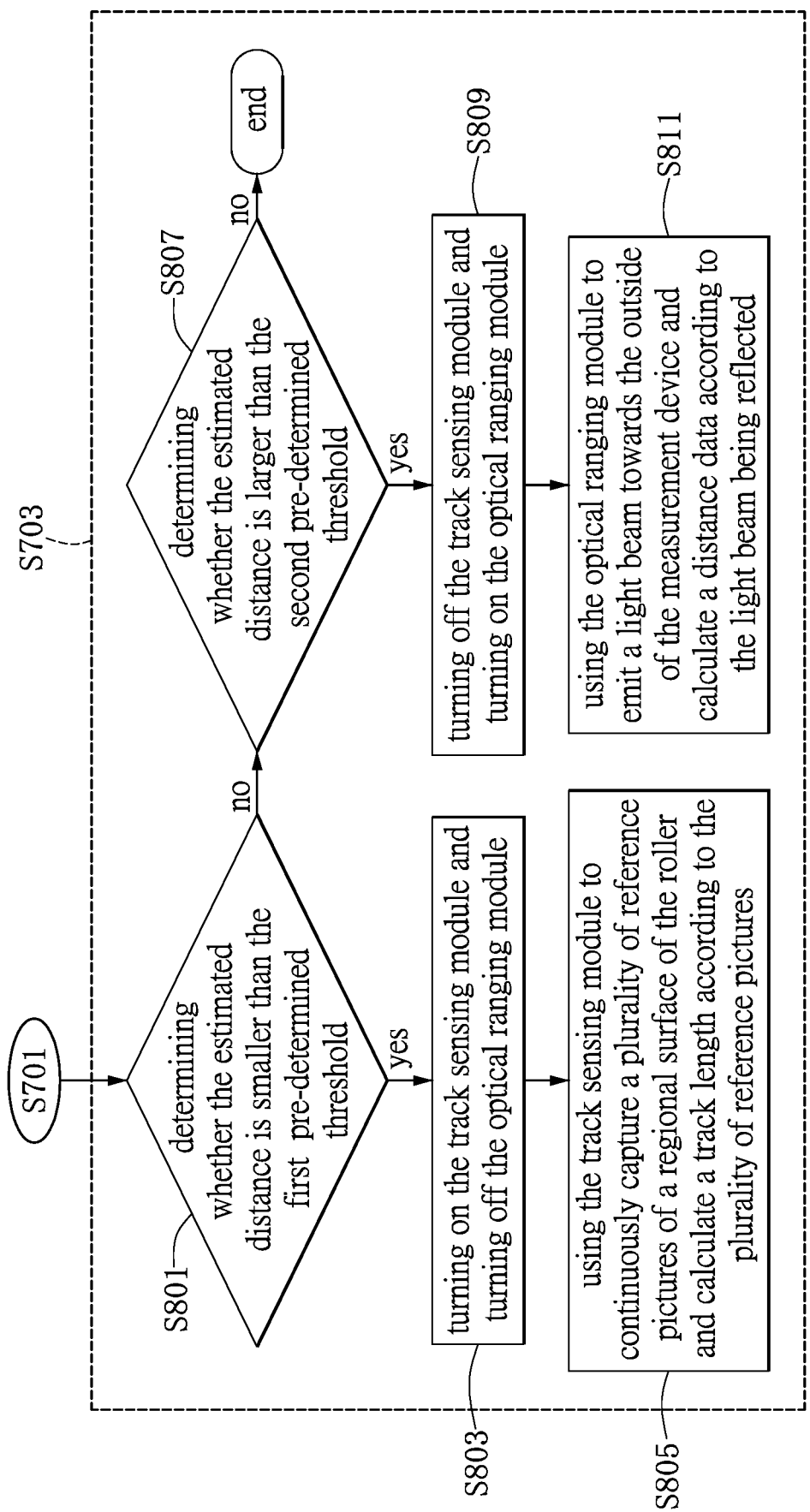
FIG. 8 is a flowchart of turning on or turning off a track sensing module and an optical ranging module in an operation method according to one embodiment of the present invention.

It should be noted that, in one embodiment of the present invention, the second pre-determined threshold is larger than or equal to the first pre-determined threshold. Moreover, referring to FIG. 8, FIG. 8 is a flowchart of turning on or turning off a track sensing module and an optical ranging module in an operation method according to one embodiment of the present invention. Steps in FIG. 8 that are identical to those in FIG. 7 are labeled in the same way, and descriptions thereof are thus not repeated.

Furthermore, Step S703 includes Step S801 to Step S811. First, in Step S801, the processor determines whether the estimated distance is smaller than the first pre-determined threshold. In Step S803, if the estimated distance is smaller than the first pre-determined threshold, the processor turns on the track sensing module and turns off the optical ranging module to perform Step S805. In Step S805, the track sensing module is used to continuously capture a plurality of reference pictures of a regional surface of the roller and calculate a track length of the measurement device along the surface of the object according to the plurality of reference pictures. On the contrary, in Step S807, the processor determines whether the estimated distance is larger than the second pre-determined threshold if the estimated distance is not smaller than the first pre-determined threshold.

Next, in Step S809, if the estimated distance is larger than the second pre-determined threshold, the processor turns off the track sensing module and turns on the optical ranging module to perform Step S811. In Step S811, the optical ranging module is used to emit a light beam towards the outside of the measurement device and calculate a distance data between the object and the measurement device according to the light beam being reflected.

As previously stated, the present invention provides a measurement device and an operation method thereof, capable of sensing a distance variation between the measurement device and an object using a built-in proximity sensor and accordingly determining whether to turn on or turn off a track sensing module and an optical ranging module such that the measurement device provides intelligent selection to achieve energy savings without being interfered with by other sensors being turned on. In addition, the measurement device in the present invention uses the rotation of the roller to acquire a relative movement on the surface of an object, and the track calculated by the built-in track sensing module is based on a plurality of reference pictures of a regional surface of the roller. The measurement device in the present invention can precisely calculate a track length of the measurement device along the surface of the object.

Figure 9:
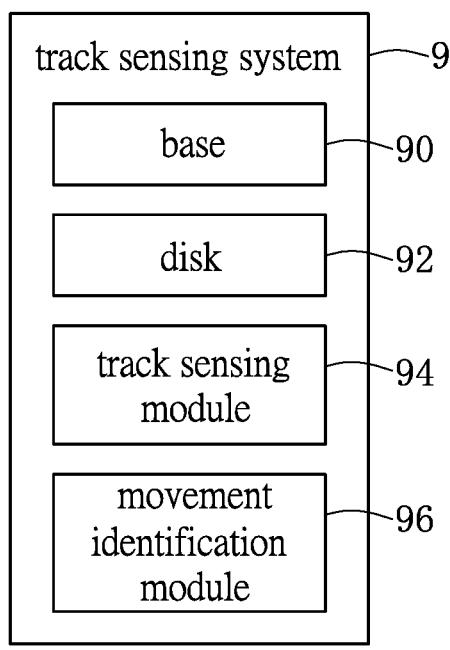
FIG. 9 is a block diagram of a track sensing system according to one embodiment of the present invention.
Figure 10:
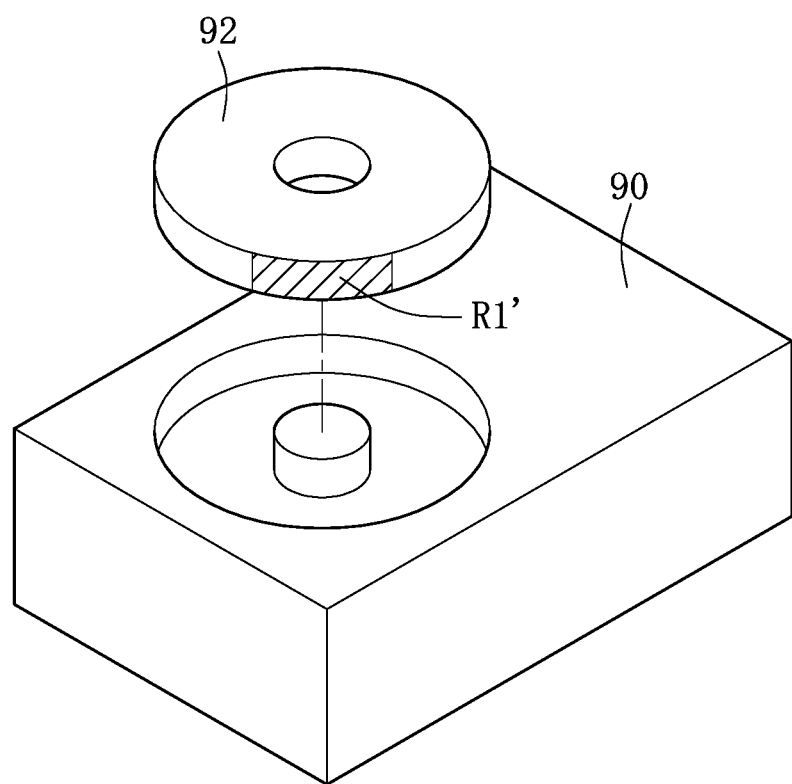
FIG. 10 is a perspective view of a base in a track sensing system according to one embodiment of the present invention.

On the other hand, as previously stated, compared to the conventional optical navigation device, one of the goals of the present invention is to capture a plurality of reference pictures of a regional surface of the roller illuminated by the light source capture. In view of this, the present invention further provides a track sensing system. Referring to FIG. 9 and FIG. 10, FIG. 9 is a block diagram of a track sensing system according to one embodiment of the present invention and FIG. 10 is a perspective view of a base in a track sensing system according to one embodiment of the present invention.

The track sensing system 9 includes a base 90, a disk 92, a track sensing module 94 and a movement identification module 96. The track sensing module 94 and the movement identification module 96 can be implemented by hardware circuitry, or by hardware circuitry with firmware or with software implemented by hardware circuitry, or by hardware circuitry with firmware or with software. To sum up, the present invention is not limited to the implementation of the track sensing system 9. Moreover, the above elements can be integrated or discretely disposed, to which the present invention is not limited.

More particularly, the base 90 is a casing, such that the track sensing system 9 can be formed as an electronic device. Therefore, the present invention is not limited to the implementation of the base 90. A person with ordinary skill in the art may make any designs according to practical demands or applications. Therefore, the base 90 will not be described in detail herein. In addition, to form the track sensing system 9 as a wearable electronic device, the track sensing system 9 has to further include a ring body (not shown). The ring body is configured to install the base 90 on a movable portion (for example, the wrist) of the user. To sum up, the present invention is not limited to the implementation of the track sensing system 9 as an electronic device. A person with ordinary skill in the art may make any designs according to practical demands or applications.

Moreover, as shown in FIG. 10, the disk 92 is disposed planarly on a surface of the base 90 and is capable of being rotated and/or pressed on at least one portion on the disk 92 by the user. The track sensing module 94 is configured to continuously capture a plurality of reference pictures of a regional surface R1' of the disk 92 and calculate a displacement and/or a pressure of/on the disk 92 rotated and/or pressed by the user according to the plurality of reference pictures. Last, the movement identification module 96 is configured to determine a movement of the user according to the displacement and/or the pressure.

Furthermore, the track sensing module 94 in the present embodiment is implemented similarly to the track sensing module 14 in FIG. 4. Therefore, the track sensing module 94 will not be described in detail herein. In brief, the track sensing module 94 in the present embodiment similarly includes a light source 140, an image sensing circuit 142 and an image analysis circuit 144.

It should be noted that, compared to the roller 10 illuminated by the light source 140 in FIG. 4, the disk 92 in the present embodiment is illuminated by the light source 140. Therefore, in the present embodiment, the regional surface R1' is defined as a regional surface on a lateral plane of the disk 92, as shown in FIG. 10. Similarly, the image sensing circuit 142 is configured to capture the plurality of reference pictures of the regional surface R1' illuminated by the light source 140 according to a fixed sampling cycle. Then, the image analysis circuit 144 is configured to compare the plurality of reference pictures based on at least one textural feature of the plurality of reference pictures to acquire an illumination track (for example, horizontal or vertical) of the light source 140 on the disk 92 on a lateral plane and calculate the displacement and/or the pressure of/on the disk 92 rotated and/or pressed by the user according to the illumination track.

However, in other embodiments, the regional surface R1' may also be defined as a regional surface of a bottom surface (not shown) of the disk 92, to which the present invention is not limited. Therefore, the reference pictures of the regional surface R1' captured by the image sensing circuit 142 indicate the reference pictures of a bottom surface of the disk 92 illuminated by the light source 140. Then, the image analysis circuit 144 compares the plurality of reference pictures based on at least one textural feature of the plurality of reference pictures to acquire an illumination track of the light source on the bottom surface of the disk 92 and calculate the displacement of the disk 92 rotated by the user according to the illumination track.

In the previous embodiments, the user may also press on at least one portion on the disk 92. Therefore, the track sensing module 94 in the present embodiment may also calculate the pressure pressed on the disk 92 by the user (i.e., the force applied by the user) according to the intensity variation of light in the regional surface R1'. For example, the track sensing module 94 may further include at least one optical sensor device (not shown). The optical sensor device is configured to sense and accumulate the intensity variation of light in the regional surface R1'. Accordingly, the image analysis circuit 144 calculates the pressure on the disk 92 pressed by the user according to the intensity variation of light from the light source 140 as analyzed by the optical sensor device. It should be noted that the present invention is not limited to the calculation of the pressure. Therefore, according to the teachings stated above, the person with ordinary skill in the art should understand that the previous implementations only exemplify, with no intention to limit, the present invention. The person with ordinary skill in the art may design the calculations of the pressure and the displacement according to practical demands or applications.

Moreover, referring again to FIG. 9, the base 90, the disk 92, the track sensing module 94 and the movement identification module 96 can be integrated to form an electronic device. The track sensing system 9 further includes a processor module (not shown) disposed in the electronic device. The processor module is configured to control the electronic device to execute a function corresponding to the movement determined by the movement identification module 96.

Figure 11:
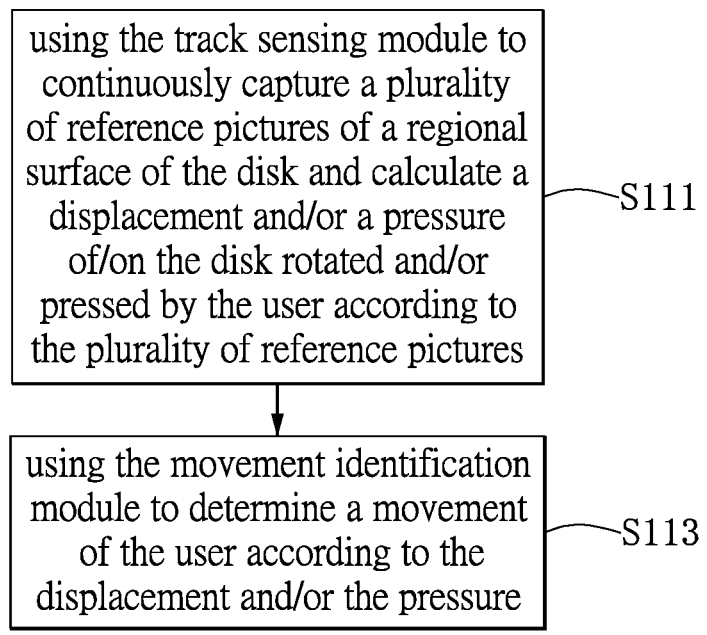
FIG. 11 is a flowchart of a track sensing method according to one embodiment of the present invention.

To describe the operation of the track sensing system, the present invention further provides a track sensing method. Referring to FIG. 11, FIG. 11 is a flowchart of a track sensing method according to one embodiment of the present invention. The track sensing method is operable with the track sensing system 9 in FIG. 9. Please refer to FIG. 9 for better understanding. In addition, steps in FIG. 11 that are identical to those in previous embodiments will not be repeated.

First, in Step S111, the track sensing module is used to continuously capture a plurality of reference pictures of a regional surface of the disk and calculate a displacement and/or a pressure of/on the disk rotated and/or pressed by the user according to the plurality of reference pictures. Then, in Step S113, the movement identification module is used to determine a movement of the user according to the displacement and/or the pressure.

As previously stated, the present invention provides a track sensing system and a track sensing method using a built-in track sensing module to sense the illumination track of the light source on the disk and accordingly calculate the displacement and/or the pressure of/on the disk 92 rotated and/or pressed by the user to further determine a movement of the user. Therefore, compared to the conventional art, the track sensing system of the present invention is less interfered with by noise to achieve better movement identification.

Figure 12:
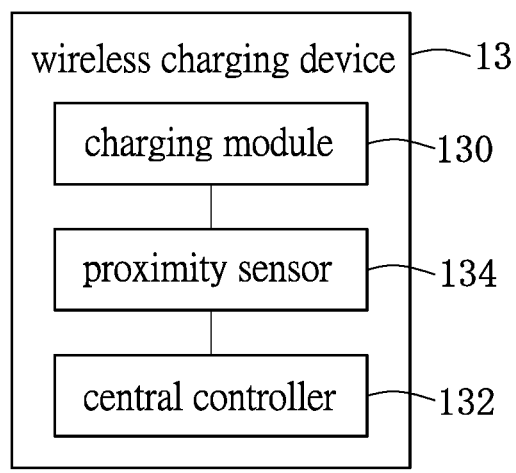
FIG. 12 is a block diagram of a wireless charging device providing proximity sensing according to one embodiment of the present invention.
Figure 13:
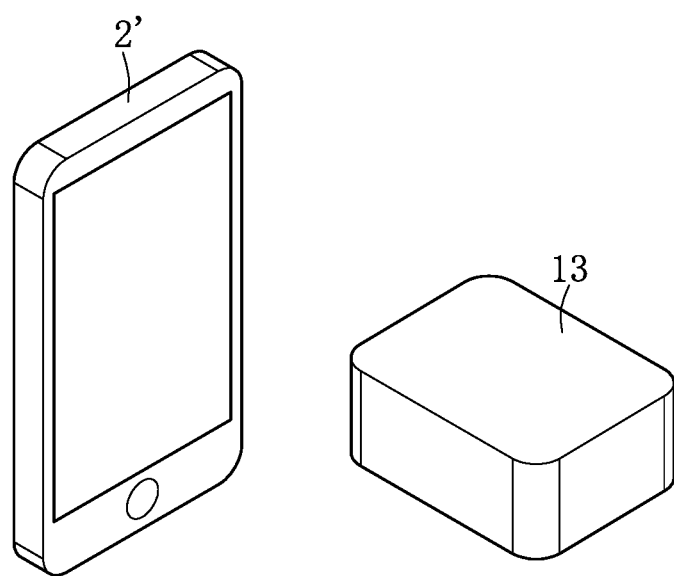
FIG. 13 is a schematic diagram of a wireless charging device providing proximity sensing according to one embodiment of the present invention.

On the other hand, as previously stated, the principle of the proximity sensor is to determine whether an object is moving closer or away. In view of this, the present invention further provides a wireless charging device capable of providing proximity sensing. Referring to FIG. 12 and FIG. 13, FIG. 12 is a block diagram of a wireless charging device providing proximity sensing according to one embodiment of the present invention and FIG. 13 is an operational diagram of a wireless charging device providing proximity sensing according to one embodiment of the present invention.

The wireless charging device 13 includes a charging module 130, at least one proximity sensor 132 and a central controller 134. The charging module 130, the proximity sensor 132 and the central controller 134 can be implemented by hardware circuitry, or by hardware circuitry with firmware or with software implemented by hardware circuitry, or by hardware circuitry with firmware or with software. To sum up, the present invention is not limited to the implementation of the wireless charging device 13. Moreover, the above elements can be integrated or discretely disposed, to which the present invention is not limited.

More particularly, the charging module 130 configured to perform wireless charging on the object 2' (for example, a mobile communication device in FIG. 13). The proximity sensor 132 is configured to sense a proximity status between the wireless charging device 13 and the object 2' and accordingly provide an estimated distance. It should be noted that, in one specific embodiment, the proximity sensor 132 can periodically sense the proximity status between the wireless charging device 13 and the object 2' and accordingly provide the estimated distance, for example, every other second, every other half second, and so forth, to which the present invention is not limited.

Moreover, the central controller 134 is coupled between the charging module 130 and the proximity sensor 132. The central controller 134 is configured to selectively turn on or turn off the control charging module 130 according to the estimated distance. The central controller 134 turns on the charging module 130 when the estimated distance is equal to or is smaller than a first threshold. The central controller 134 controls the charging module 130 to perform wireless charging on the object 2' when the estimated distance is equal to or is smaller than a second threshold.

Furthermore, the charging module 130 is used to enable the wireless charging device 13 to perform wireless charging on the object 2'. Therefore, the present invention is not limited to the implementation of the charging module 130. A person with ordinary skill in the art may make any designs according to practical demands or applications. Therefore, the charging module 130 will not be described in detail herein. Moreover, since the implementation of the proximity sensor 132 is similar to the proximity sensor 12 in FIG. 3A or FIG. 3B, the proximity sensor 130 will not be described in detail herein. It should be noted that the proximity sensor 132 of the present embodiment can be controlled to be permanently turned on since the proximity sensor 132 has the advantage of low power consumption.

More particularly, as shown in FIG. 13, only the proximity sensor 130 is controlled to be permanently turned on at an initial stage. Meanwhile, the other modules or circuits (for example, the charging module 130) in the wireless charging device 13 are controlled to be turned off. Then, as the object 2' continuously moves closer to the wireless charging device 13, the central controller 134 correspondingly controls the charging module 130 in the wireless charging device 13 to be turned on if the central controller 134 determines that the estimated distance is equal to or is smaller than the first threshold (for example, 50 cm). When the estimated distance is equal to or is smaller than the second threshold (for example, 10 cm), the central controller 134 enables the charging module 130 to perform wireless charging on the object 2'. On the contrary, as the object 2' continuously moves away from the wireless charging device 13, the central controller 134 stops the charging module 130 from performing wireless charging on the object 2' if the central controller 134 determines that the estimated distance is larger than the second threshold (for example, 10 cm). When the distance is larger than the first threshold (for example, 50 cm), the central controller 134 correspondingly controls the charging module 130 to be turned off.

As a result, the wireless charging device 13 can be prevented from unnecessary power consumption to achieve energy saving. It should be noted that the above implementation only exemplifies, with no intention to limit, the present invention. A person with ordinary skill in the art may design the wireless charging device and the proximity sensor according to practical demands or applications.

On the other hand, according to the teachings stated above, a person with ordinary skill in the art would understand that the central controller 132 in the present embodiment may also control the wireless charging device 13 to execute other functions on the object 2' according to the estimated distance. For example, the wireless charging device 13 further includes a wireless transmission module (not shown). When the central controller 132 determines that the estimated distance is equal to or is smaller than a third threshold (for example, 30 cm), the central controller 132 may correspondingly turn on the wireless transmission module and enable the wireless charging device 13 to perform data transmission with other electronic devices (not shown) through the wireless transmission module.

Accordingly, the present invention provides a wireless charging device, capable of sensing a distance variation between the wireless charging device and an object using a built-in proximity sensor and accordingly determining whether to turn on or turn off the charging module to achieve energy saving.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A measurement device, comprising:
   a roller disposed at a bottom of said measurement device;
   at least one proximity sensor configured to sense a proximity status between said measurement device and an object and accordingly provide an estimated distance;
   a track sensing module disposed in said measurement device and configured to continuously capture a plurality of reference pictures of a regional surface of said roller and calculate a track length of said measurement device according to said plurality of reference pictures;
   an optical ranging module disposed in said measurement device and configured to emit a light beam towards the outside of said measurement device and calculate a distance data according to said light beam being reflected; and
   a processor coupled among said proximity sensor, said track sensing module and said optical ranging module and configured to selectively turn on or turn off said track sensing module and said optical ranging module according to said estimated distance;
   wherein said processor turns on said track sensing module and turns off said optical ranging module when said estimated distance is smaller than a first pre-determined threshold, and said processor turns off said track sensing module and turns on said optical ranging module when said estimated distance is larger than a second pre-determined threshold.

2. The measurement device of claim 1, wherein said second pre-determined threshold is larger than or equal to said first pre-determined threshold.

3. The measurement device of claim 1, wherein said track sensing module comprises:
   a light source configured to illuminate said regional surface of said roller;
   an image sensing circuit configured to capture said plurality of reference pictures of said regional surface illuminated by said light source based on a fixed sampling cycle; and
   an image analysis circuit configured to compare said plurality of reference pictures based on at least one textural feature of said plurality of reference pictures to acquire an illumination track of said light source on said roller and calculate said track length of said measurement device according to said illumination track.

4. The measurement device of claim 1, wherein said proximity sensor comprises:
   an emitter unit configured to emit an optical signal; and
   a receiver unit configured to receive said optical signal being reflected and determine said proximity status between said measurement device and said object according to an intensity variation of said received optical signal to correspondingly provide said estimated distance.

5. The measurement device of claim 1, wherein said proximity sensor comprises:
   an image capture unit configured to capture an image of said object; and
   a pixel processing unit coupled to said image capture unit and configured to calculate a number of pixel clusters occupied by said object according to said image and determine said proximity status between said measurement device and said object according to said number of pixel clusters to correspondingly provide said estimated distance.

6. The measurement device of claim 1, wherein said optical ranging module comprises:
   a light-emitting device configured to emit said light beam towards the outside of said measurement device;
   an optical sensor device configured to sense and accumulate an energy of said light beam being reflected according to a shutter cycle signal to correspondingly provide an optical sensing signal;
   a control circuit configured to control said light-emitting device to continuously emit said light beam within a light-emitting period and switch said shutter cycle signal to a high level state within a sensing period after said light-emitting device has emitted said light beam for a delayed period, such that said optical sensor device senses and accumulates said energy of said light beam being reflected and accordingly provides said optical sensing signal; and
   a distance calculating circuit configured to acquire a time-of-flight (TOF) data according to said energy of said light beam emitted by said light-emitting device within said light-emitting period and said optical sensing signal and calculate said distance data according to said time-of-flight data.

7. The measurement device of claim 6, wherein said light-emitting device is a light-emitting diode and said optical sensor device is a charge coupled device (CCD) or a complementary metal-oxide-semiconductor (MOS) optical sensor device.

8. The measurement device of claim 1, wherein said measurement device further comprises:
a display module configured to display said distance data calculated by said optical ranging module and/or said track length calculated by said track sensing module.

9. An operation method for a measurement device, wherein said measurement device comprises a roller, at least one proximity sensor, a track sensing module, an optical ranging module and a processor, said roller is disposed at a bottom of said measurement device and said operation method comprises steps of:
using said proximity sensor to sense a proximity status between said measurement device and an object and accordingly provide an estimated distance; and
using said processor to selectively turn on or turn off said track sensing module and said optical ranging module according to said estimated distance, wherein said processor turns on said track sensing module and turns off said optical ranging module when said estimated distance is smaller than a first pre-determined threshold, and said processor turns off said track sensing module and turns on said optical ranging module when said estimated distance is larger than a second pre-determined threshold.

10. The operation method of claim 9, wherein said second pre-determined threshold is larger than or equal to said first pre-determined threshold.

11. The operation method of claim 9, wherein, after said processor turns on said track sensing module, said operation method further comprises a step of:
using said track sensing module to continuously capture a plurality of reference pictures of a regional surface of said roller and calculate a track length of said measurement device according to said plurality of reference pictures.

12. The operation method of claim 9, wherein, after said processor turns on said optical ranging module, said operation method further comprises a step of:

using said optical ranging module to emit a light beam towards the outside of said measurement device and calculate a distance data according to said light beam being reflected.

13. A track sensing system, comprising:
a base;
a disk disposed on a surface of said base and being capable of being rotated and/or pressed on at least one portion on said disk by the user;
a track sensing module disposed on a side of said disk and configured to continuously capture a plurality of reference pictures of a regional surface of said disk and calculate a displacement and/or a pressure of/on said disk rotated and/or pressed by the user according to said plurality of reference pictures; and
a movement identification module configured to determine a movement of the user according to said displacement and/or said pressure.

14. The track sensing system of claim 13, wherein said track sensing module comprises:
a light source configured to illuminate said regional surface of said disk;
an image sensing circuit configured to capture said plurality of reference pictures of said regional surface illuminated by said light source according to a fixed sampling cycle; and
an image analysis circuit configured to compare said plurality of reference pictures based on at least one textural feature of said plurality of reference pictures to acquire an illumination track of said light source on said disk and calculate said displacement and/or said pressure of/on said disk rotated and/or pressed by the user according to said illumination track.

15. The track sensing system of claim 13, wherein said base, said disk, said track sensing module and said movement identification module form an electronic device and said track sensing system further comprises a processor module disposed in said electronic device, wherein said processor module is configured to control said electronic device to execute a function corresponding to said movement.

* * * * *